US012798922B2

(12) United States Patent
Sato

(10) Patent No.: US 12,798,922 B2
(45) Date of Patent: Nov. 17, 2026

(54) DERAILMENT DETECTION SYSTEM FOR ELEVATOR

(71) Applicant: Mitsubishi Electric Corporation, Tokyo (JP)

(72) Inventor: Shinichi Sato, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 558 days.

(21) Appl. No.: 18/378,169

(22) Filed: Oct. 10, 2023

(65) Prior Publication Data

US 2024/0359947 A1 Oct. 31, 2024

(30) Foreign Application Priority Data

Apr. 25, 2023 (JP) ................................ 2023-071379

(51) Int. Cl.
*B66B 5/02* (2006.01)

(52) U.S. Cl.
CPC ..................................... *B66B 5/02* (2013.01)

(58) Field of Classification Search
CPC ................................. B66B 5/02; B66B 5/022
See application file for complete search history.

(56) References Cited

U.S. PATENT DOCUMENTS 4,643,276 A * 2/1987 Philobos ................ B66B 5/022 187/278
9,033,113 B2 * 5/2015 Winey .................... B66B 5/022 187/391
10,549,949 B2 * 2/2020 Kato ......................... B66B 7/02
2012/0024636 A1 * 2/2012 Niikawa .................. B66B 5/02 187/391
2019/0039860 A1 2/2019 Sato
2019/0084805 A1 * 3/2019 Koide .................. B66B 5/0031
2019/0119069 A1 * 4/2019 Koide ....................... B66B 1/48

FOREIGN PATENT DOCUMENTS

JP S55-140056 U 10/1980
JP S56-064968 U 5/1981
JP S61-254483 A 11/1986
WO 2017/183084 A1 10/2017

OTHER PUBLICATIONS

Office Action dated Jan. 6, 2026 in the corresponding JP patent application No. 2023-071379, 6pp.

* cited by examiner

*Primary Examiner* — Rina I Duda
(74) *Attorney, Agent, or Firm* — XSENSUS LLP

(57) ABSTRACT

A derailment detection system for an elevator includes a wire that is installed in a space which does not interfere with a movement space of ascending-descending bodies ascending and descending in a shaft and that is stretched in parallel with a guide rail guiding ascent and descent of a counterweight, a pass-through detection sensor that is installed in the counterweight and detects whether or not the wire passes through an internal space, a wire-contact detection sensor that is installed in the counterweight and detects whether or not the wire-contact detection sensor is in contact with the wire, and derailment judgment processor that performs a derailment judgment process based on signals output from the pass-through detection sensor and the wire-contact detection sensor.

20 Claims, 9 Drawing Sheets

DIAGRAM IN WHICH COUNTERWEIGHT IS SEEN FROM UPPER PORTION OF SHAFT
(NORMAL CONDITION)

DIAGRAM IN WHICH COUNTERWEIGHT IS SEEN FROM UPPER PORTION OF SHAFT
(DERAILMENT CONDITION)

DIAGRAM IN WHICH COUNTERWEIGHT IS SEEN FROM SIDE SURFACE OF SHAFT (NORMAL CONDITION)

DIAGRAM IN WHICH COUNTERWEIGHT IS SEEN FROM SIDE SURFACE OF SHAFT (DERAILMENT CONDITION)

Fig. 5

| No | CONDITION | WIRE-CONTACT DETECTION SENSOR | PATH-THROUGH DETECTION SENSOR | DERAILMENT JUDGMENT RESULT | CONTINUE/STOP OPERATION |
|---|---|---|---|---|---|
| 1 | NORMAL OPERATION CONDITION | ON (NOT CONTACTING) | ON (PASSING THROUGH) | ON (NON-DERAILMENT) | CONTINUING OPERATION |
| 2 | DETECTION OF CONTACT WITH WIRE | OFF (CONTACTING) | ON (PASSING THROUGH) | OFF (DERAILMENT) | STOPPING OPERATION |
| 3 | DETECTION OF DISCONNECTION OF WIRE AND NON-PASSING-THROUGH CONDITION | ON (NOT CONTACTING) | OFF (NOT PASSING THROUGH) | OFF (DERAILMENT) | STOPPING OPERATION |
| 4 | WIRE-CONTACT DETECTION SENSOR CONTINUING OUTPUT OF OFF SIGNAL | CONTINUING OFF SIGNAL (CONTACTING) | ON (PASSING THROUGH) /OFF (NOT PASSING THROUGH) | OFF (DERAILMENT) /OFF (DERAILMENT) | STOPPING /STOPPING |
| 5 | PASS-THROUGH DETECTION SENSOR CONTINUING OUTPUT OF OFF SIGNAL | ON (NOT CONTACTING) /OFF (CONTACTING) | CONTINUING OFF SIGNAL (NOT PASSING THROUGH) | OFF (DERAILMENT) /OFF (DERAILMENT) | STOPPING /STOPPING |
| 6 | WIRE-CONTACT DETECTION SENSOR CONTINUING OUTPUT OF ON SIGNAL | CONTINUING ON SIGNAL (NOT CONTACTING) | ON (PASSING THROUGH) /OFF (NOT PASSING THROUGH) | ON (NON-DERAILMENT) /OFF (DERAILMENT) | CONTINUING /STOPPING |
| 7 | PASS-THROUGH DETECTION SENSOR CONTINUING OUTPUT OF ON SIGNAL | ON (NOT CONTACTING) /OFF (CONTACTING) | CONTINUING ON SIGNAL (PASSING THROUGH) | ON (NON-DERAILMENT) /OFF (DERAILMENT) | CONTINUING /STOPPING |
| 8 | POWER SHUT-OFF CONDITIONS OF WIRE-CONTACT DETECTION SENSOR AND PASS-THROUGH DETECTION SENSOR | OFF (CONTACTING) | OFF (NOT PASSING THROUGH) | OFF (DERAILMENT) | STOPPING OPERATION |

DIAGRAM IN WHICH COUNTERWEIGHT IS SEEN FROM UPPER PORTION OF SHAFT

DIAGRAM IN WHICH COUNTERWEIGHT IS SEEN FROM SIDE SURFACE OF SHAFT

DERAILMENT DETECTION SYSTEM FOR ELEVATOR

CROSS-REFERENCE TO RELATED APPLICATION

The present application claims priority under 35 U.S.C. § 119 to Japanese Patent Application No. 2023-071379, filed on Apr. 25, 2023, the contents of which application are incorporated herein by reference in their entirety.

TECHNICAL FIELD

The present disclosure relates to a derailment detection system for an elevator which detects detachment of a counterweight of an elevator from a rail due to an earthquake or the like.

BACKGROUND ART

A derailment detection system for an elevator in related art has caused a current to flow through a conductive wire provided in a shaft in parallel with an ascending-descending direction of a counterweight and has thereby detected contact of the conductive wire with a contact element or thereby judged whether or not a magnetic field intensity of a magnetic field produced by the current flowing through the conductive wire is in a permissible range (for example, see WO 2017/183084 A1).

The derailment detection system for an elevator in related art has a problem that because a current is flowing through a conductive wire provided in a shaft, a current shut-off circuit for the conductive wire is provided for securing safety, and shutting off is performed by this current shut-off circuit when work for maintenance and check is performed in the shaft.

SUMMARY

The present disclosure has been made for solving the above problem, and an object thereof is to provide a derailment detection system for an elevator which makes it possible to detect derailment of a counterweight without performing shutting off by a current shut-off circuit for a conductive wire even when work for maintenance and check is performed in a shaft.

The features and advantages of the present disclosure may be summarized as follows.

A derailment detection system for an elevator includes: a wire that is installed in a space which does not interfere with a movement space of ascending-descending bodies ascending and descending in a shaft and that is stretched in parallel with a guide rail guiding ascent and descent of a counterweight: a pass-through detection sensor that is installed in the counterweight and detects whether or not the wire passes through an internal space: a wire-contact detection sensor that is installed in the counterweight and detects whether or not the wire-contact detection sensor is in contact with the wire; and a derailment judgment processor that performs a derailment judgment process based on signals output from the pass-through detection sensor and the wire-contact detection sensor.

Other and further objects, features and advantages of the disclosure will appear more fully from the following description.

BRIEF DESCRIPTION OF DRAWINGS

FIG. 5 is a judgment result combination table of the derailment detection system for the elevator according to the first embodiment.

DESCRIPTION OF EMBODIMENTS

First Embodiment

Figure 1:
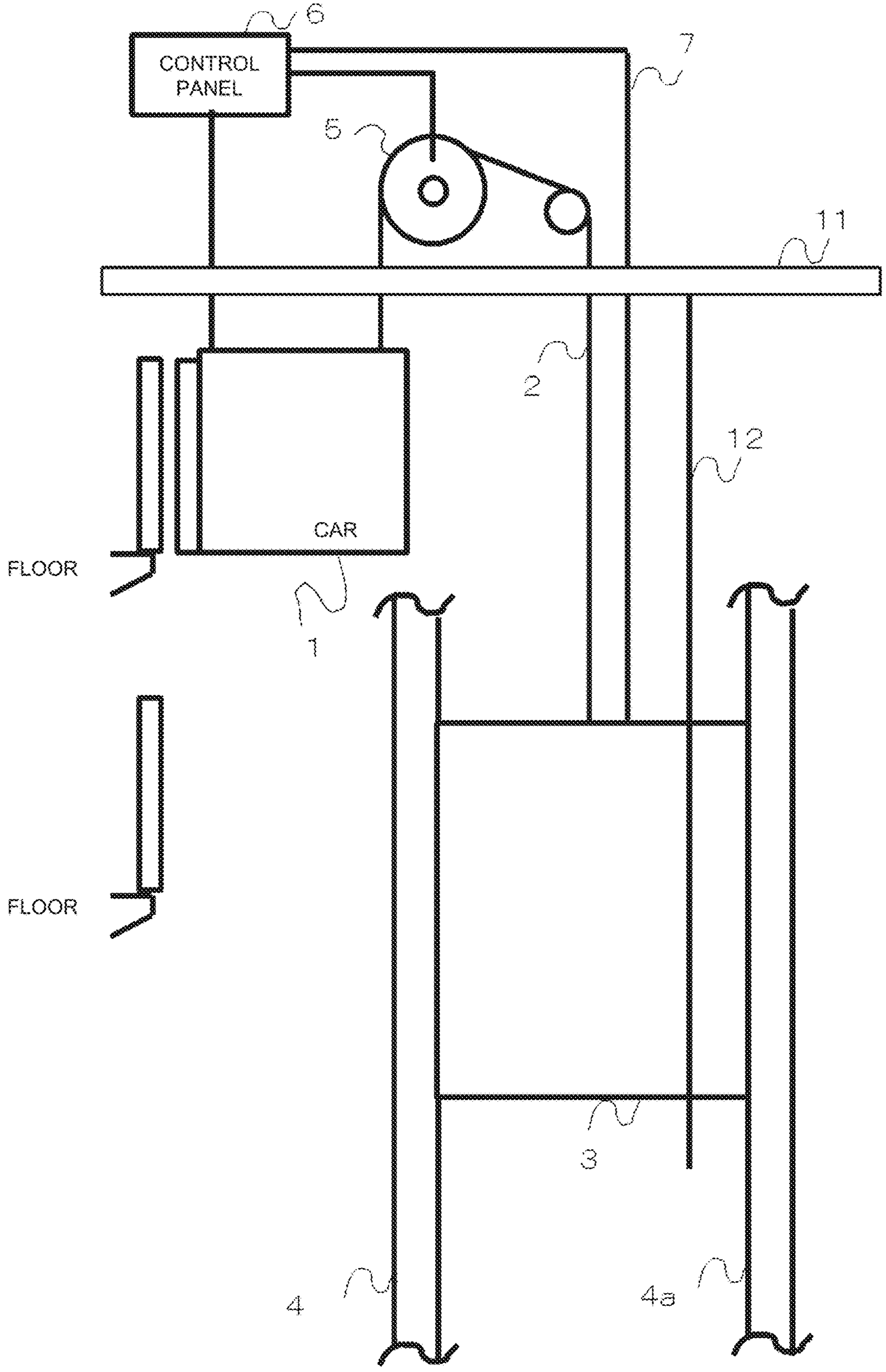
FIG. 1 is an overall configuration diagram of an elevator according to a first embodiment.

An overall configuration of an elevator in a first embodiment will be described by using FIG. 1. FIG. 1 is an overall configuration diagram of the elevator.

The elevator includes a car 1, a main rope 2, a counterweight 3, guide rails 4 and 4*a*, a traction machine 5, a control panel 6, and a wiring cable 7.

One end of the main rope 2 is connected with an upper end of the car 1, and the counterweight 3 is connected with the other end of the main rope 2. The traction machine 5 is installed in an intermediate portion of the main rope 2 such that the car 1 and the counterweight 3 ascend and descend in mutually opposite directions.

The counterweight 3 is moved while being guided by the guide rails 4 and 4*a* installed in shaft walls (not illustrated) of the shaft.

The control panel 6 drives the traction machine 5 and thereby controls ascent and descent of the car 1.

Here, the car 1 and the counterweight 3 will be defined as ascending-descending bodies which ascend and descend in the shaft.

The control panel 6 receives a signal from an apparatus installed in the counterweight 3 via the wiring cable 7.

In the shaft in which the car 1 and the counterweight 3 ascend and descend, a wire 12 is mounted on a portion from a lower side of a floor surface of a machine room floor 11 to a pit in a lowermost portion of the shaft.

The wire 12 is stretched in parallel with the guide rails 4 and 4*a* of the counterweight 3. Apparatuses installed in the counterweight according to the first embodiment will be described by using FIG. 2A, FIG. 2B, FIG. 2C and FIG. 2D.

Figure 2A:
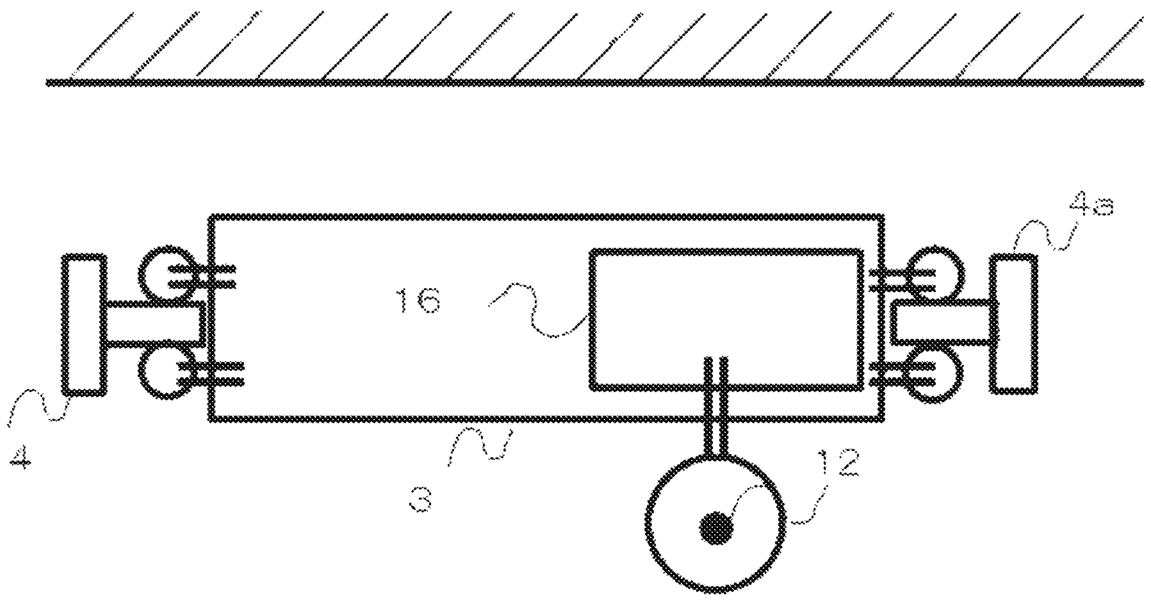
FIG. 2A is a top view of a counterweight in a shaft of the elevator according to the first embodiment.
Figure 2B:
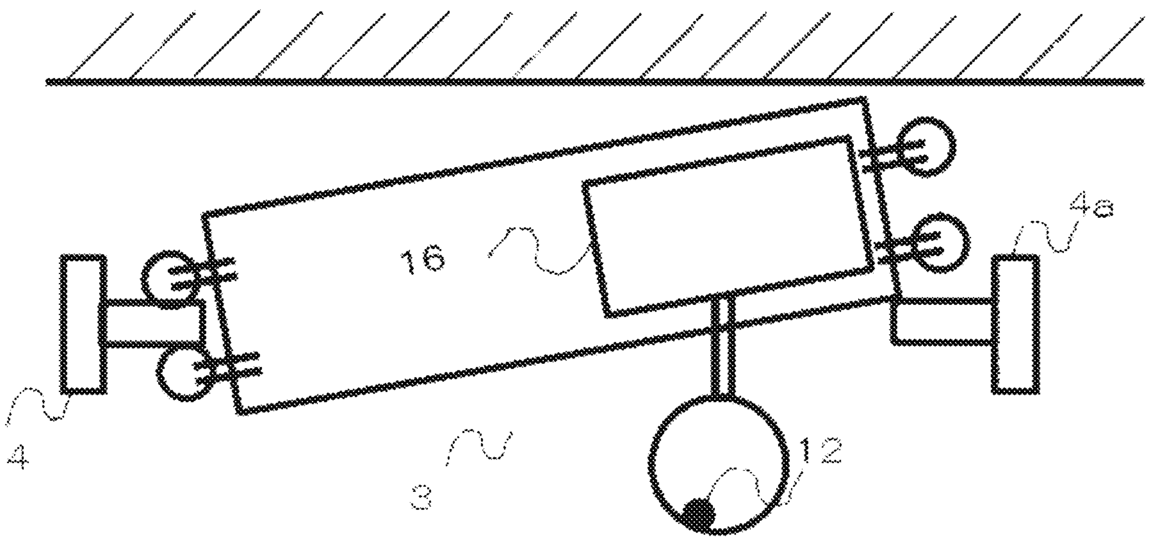
FIG. 2B is a top view of the counterweight in the shaft of the elevator according to the first embodiment.

FIG. 2A, which is a diagram in which the counterweight 3 is seen from an upper portion of the shaft (normal condition), and FIG. 2B, which is a diagram in which the counterweight 3 is seen from the upper portion of the shaft (derailment condition), are diagrams in which the counterweight is seen from the upper portion of the shaft of the elevator according to the first embodiment.

Figure 2C:
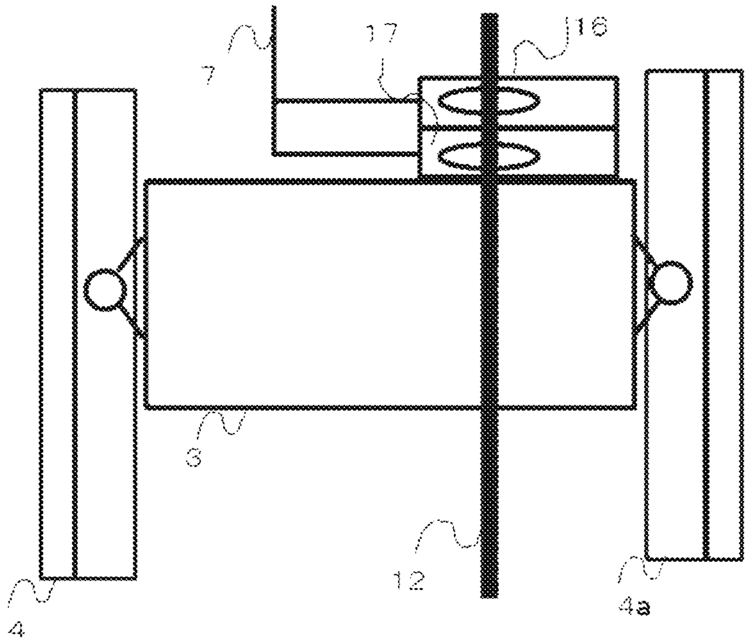
FIG. 2C is a side view of the counterweight in the shaft of the elevator according to the first embodiment.
Figure 2D:
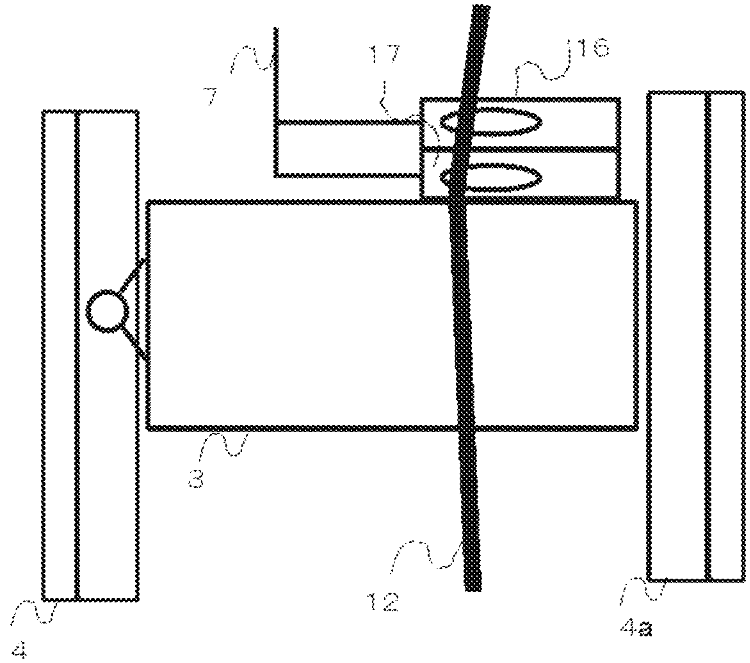
FIG. 2D is a side view of the counterweight in the shaft of the elevator according to the first embodiment.

FIG. 2C, which is a diagram in which the counterweight 3 is seen from a side surface of the shaft (normal condition), and FIG. 2D, which is a diagram in which the counterweight 3 is seen from the side surface of the shaft (derailment condition), are diagrams in which the counterweight of the elevator according to the first embodiment is seen from the side surface of the shaft.

In FIG. 2A, which is the diagram in which the counterweight 3 is seen from the upper portion of the shaft (normal condition), in a portion close to the counterweight 3, the wire 12 is stretched in parallel with the guide rails 4 and 4*a*. The wire 12 may be stretched in any position which is a position not interfering with the ascending-descending bodies in a range which detectors of the apparatuses installed in the counterweight 3 reach.

In FIG. 2C, which is the diagram in which the counterweight 3 is seen from the side surface of the shaft (normal condition), the counterweight 3 includes an upper portion pass-through detection sensor 16 and an upper portion wire-contact detection sensor 17.

The upper portion pass-through detection sensor 16 and the upper portion wire-contact detection sensor 17 are installed in an upper portion of the counterweight 3 and are connected with the wiring cable 7.

The upper portion pass-through detection sensor 16 may be installed on a lower side of the upper portion wire-contact detection sensor 17.

The upper portion pass-through detection sensor 16 is a pass-through detection sensor which includes a tubular detection unit through whose internal portion the wire 12 passes and which detects whether or not the wire 12 passes through the internal portion of the tubular detection unit. A pass-through detection signal which is detected by the pass-through detection sensor is sent to the control panel 6 via the wiring cable 7.

The upper portion wire-contact detection sensor 17 is a wire-contact detection sensor which includes a tubular detection unit through whose internal portion the wire 12 passes and which detects whether or not the wire 12 is in contact with the tubular detection unit. A wire-contact detection signal which is detected by the wire-contact detection sensor is sent to the control panel 6 via the wiring cable 7.

The tubular detection units of the upper portion pass-through detection sensor 16 and the upper portion wire-contact detection sensor 17 may be integrally formed.

Shapes of the detection units of the upper portion pass-through detection sensor 16 and the upper portion wire-contact detection sensor 17 may be polygonal shapes other than tubular shapes.

In FIG. 2B, which is the diagram in which the counterweight 3 is seen from the upper portion of the shaft (derailment condition), and FIG. 2D, which is the diagram in which the counterweight 3 is seen from the side surface of the shaft (derailment condition), the counterweight 3 is in a derailment condition where that is detached from the guide rails 4 and 4*a* and derailment is occurring.

Due to the derailment of the counterweight 3 from the guide rails 4 and 4*a*, the wire 12 is pulled by the detection units of the upper portion pass-through detection sensor 16 and the upper portion wire-contact detection sensor 17 and is in a contacting condition.

In addition, FIG. 2B and FIG. 2D illustrate a condition where the counterweight 3 is inclined with respect to the guide rails 4 and 4*a*, but when the counterweight 3 is further inclined, the wire 12 is disconnected, and this causes a condition where the wire 12 does not pass through the detection unit of the upper portion pass-through detection sensor 16.

Figure 3:
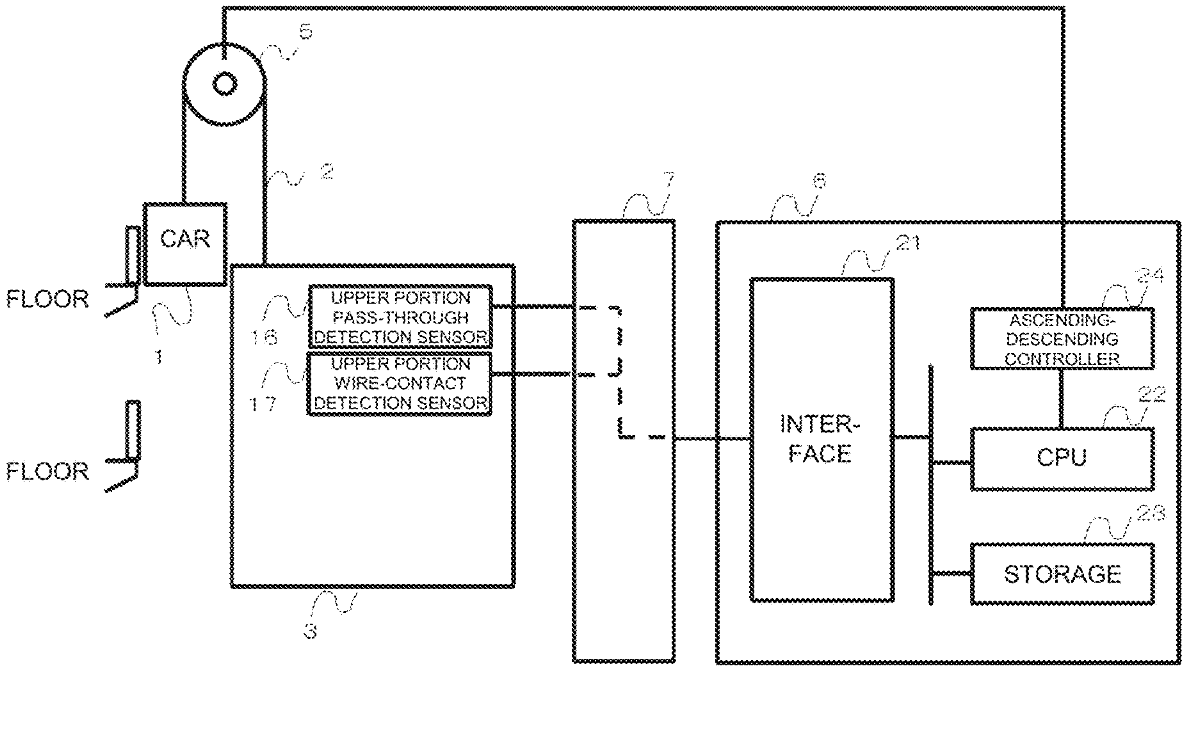
FIG. 3 is a block diagram of a derailment detection system for the elevator according to the first embodiment.

A block diagram of a derailment detection system for an elevator according to the first embodiment will be described by using FIG. 3. FIG. 3 is a block diagram of the derailment detection system for an elevator according to the first embodiment.

The control panel 6 of the derailment detection system for an elevator includes an interface 21, a CPU 22, a storage 23, and an ascending-descending controller 24.

The interface 21 of the control panel 6 receives an upper portion pass-through detection signal and an upper portion wire-contact detection signal that are transmitted from the upper portion pass-through detection sensor 16 and the upper portion wire-contact detection sensor 17, which are installed in the counterweight 3, and transmits the respective received detection signals to the CPU 22.

Based on the upper portion pass-through detection signal and the upper portion wire-contact detection signal which are obtained via the interface 21, the CPU 22 outputs a derailment judgment result.

Here, the CPU 22 will be defined as a derailment judgment processor.

Based on the derailment judgment result obtained from the CPU 22, the ascending-descending controller 24 performs either one of operation continuation or operation stop of ascent and descent of the car 1.

The storage 23 stores a control program and saves data of a control arithmetic operation of the CPU 22.

As the storage 23, a static random access memory (SRAM), an electrically erasable programmable read-only memory (EEPROM), or the like may be used, and the storage 23 may be any means as long as that is capable of storing data and of reading the stored data.

Figure 4:
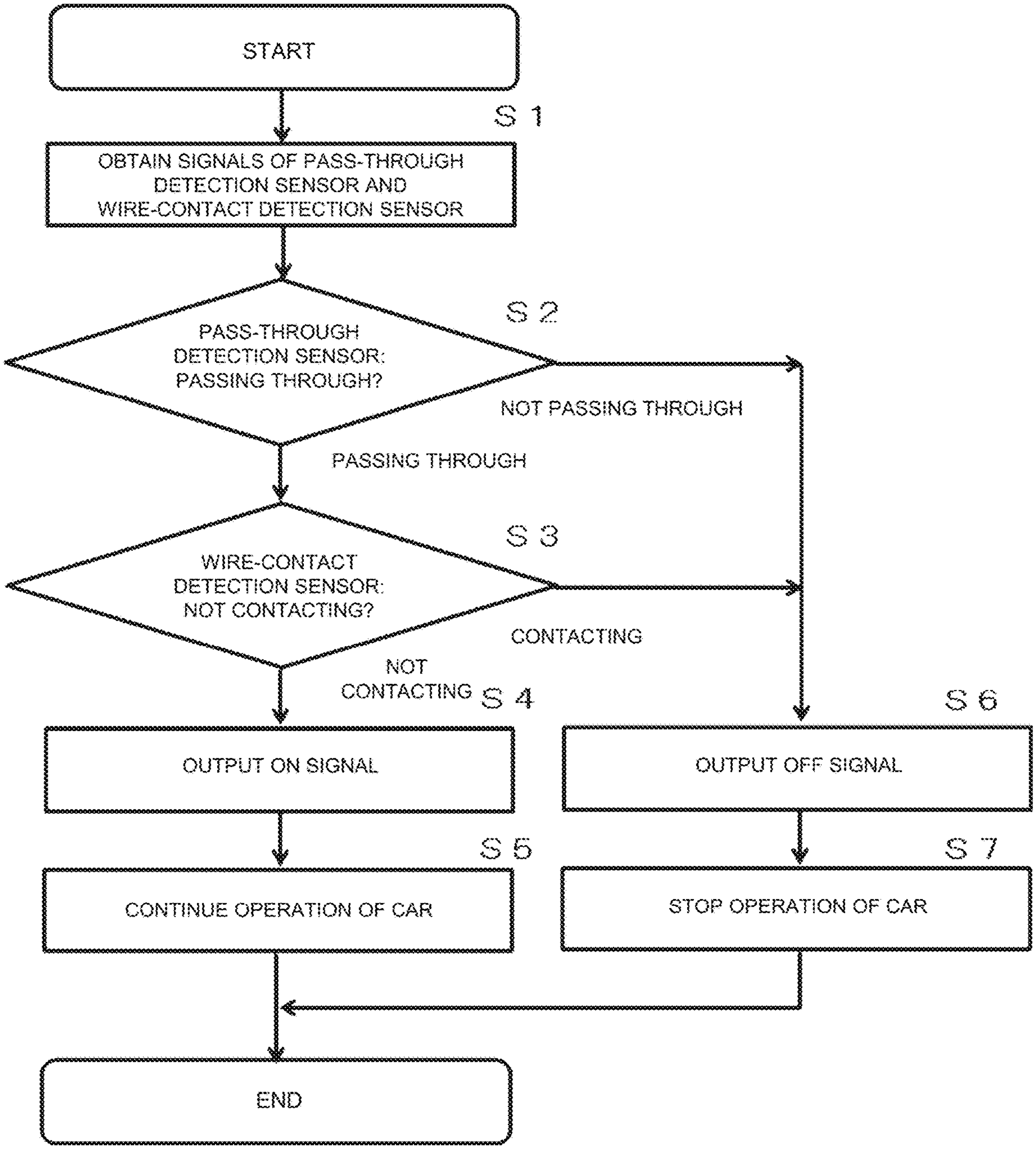
FIG. 4 is a flowchart of the derailment detection system for the elevator according to the first embodiment.

By using FIG. 4 and FIG. 5, a description will be made about combinations of a flowchart and judgment results of the derailment detection system for an elevator according to the first embodiment. FIG. 4 is a flowchart of the derailment detection system for an elevator according to the first embodiment. FIG. 5 is a judgment result combination table of the derailment detection system for an elevator.

In step S1, the CPU 22 of the control panel 6 of the derailment detection system for an elevator respectively obtains the upper portion pass-through detection signal and the upper portion wire-contact detection signal from the upper portion pass-through detection sensor 16 and the upper portion wire-contact detection sensor 17.

Here, the following signals are output from the upper portion pass-through detection sensor 16 and the upper portion wire-contact detection sensor 17 in accordance with a detection result about the wire 12.

The upper portion pass-through detection sensor 16 outputs an ON signal when the wire 12 passes through the detection unit and outputs an OFF signal when the wire 12 does not pass through the detection unit. Further, when no power is supplied to the upper portion pass-through detection sensor 16, the OFF signal is output.

The upper portion wire-contact detection sensor 17 outputs an OFF signal when the wire 12 is in contact with a contact detection unit and outputs an ON signal when the wire 12 is not in contact with the contact detection unit. Further, when no power is supplied to the upper portion wire-contact detection sensor 17, the OFF signal is output.

In step S2, the CPU 22 judges whether or not the upper portion pass-through detection sensor 16 outputs the ON signal.

In a case where the ON signal is obtained from the upper portion pass-through detection sensor 16, the CPU 22 proceeds to step S3 (PASSING THROUGH in step S2).

On the other hand, in a case where the OFF signal is obtained from the upper portion pass-through detection sensor 16, the CPU 22 proceeds to step S6.

In step S3, the CPU 22 judges whether or not the upper portion wire-contact detection sensor 17 outputs the ON signal.

In a case where the ON signal is obtained from the upper portion wire-contact detection sensor 17, the CPU 22 proceeds to step S4 (NOT CONTACTING in step S3).

On the other hand, in a case where the OFF signal is obtained from the upper portion wire-contact detection sensor 17, the CPU 22 proceeds to step S6.

In step S4, based on the upper portion pass-through detection signal and the upper portion wire-contact detection signal, the CPU 22 outputs the ON signal to the ascending-descending controller 24 and proceeds to step S5.

In step S5, the ascending-descending controller 24 continues operations of ascent and descent of the car 1 based on the ON signal obtained from the CPU 22.

In step S6, based on the upper portion pass-through detection signal and the upper portion wire-contact detection signal, the CPU 22 outputs the OFF signal to the ascending-descending controller 24 and proceeds to step S7.

In step S7, the ascending-descending controller 24 stops operations of ascent and descent of the car 1 based on the OFF signal obtained from the CPU 22.

Here, a description will be made about the judgment result combination table of the derailment detection system for an elevator in FIG. 5.

In "normal operation condition" of No. 1 in FIG. 5, because the upper portion wire-contact detection sensor 17 is not in contact with the wire 12 (not contacting), the ON signal is output. Further, because the wire 12 passes through the upper portion pass-through detection sensor 16 (passing through), the ON signal is output.

In the "normal operation condition" of No. 1 in FIG. 5, the derailment judgment result indicates the ON signal and indicates a non-derailment condition where the counterweight 3 is not derailed, and the operation of the car 1 is continued.

In "detection of contact with wire" of No. 2 in FIG. 5, because the upper portion wire-contact detection sensor 17 is in contact with the wire 12 (contacting), the OFF signal is output.

Further, because the wire 12 passes through the upper portion pass-through detection sensor 16 (passing through), the ON signal is output.

In the "detection of contact with wire" of No. 2 in FIG. 5, the derailment judgment result indicates the OFF signal and indicates a condition where the counterweight 3 is derailed, and the operation of the car 1 is stopped.

In "detection of disconnection of wire and non-passing-through condition" of No. 3 in FIG. 5, because the upper portion wire-contact detection sensor 17 is not in contact with the wire 12 (not contacting), the ON signal is output.

Further, because the wire 12 does not pass through the upper portion pass-through detection sensor 16 (not passing through), the OFF signal is output.

In the "detection of disconnection of wire and non-passing-through condition" of No. 3 in FIG. 5, the derailment judgment result indicates the OFF signal and indicates the condition where the counterweight 3 is derailed, and the operation of the car 1 is stopped.

In "wire-contact detection sensor continuing output of OFF signal" of No. 4 in FIG. 5, because a signal output circuit of the upper portion wire-contact detection sensor 17 is in failure even when the upper portion wire-contact detection sensor 17 is not in contact with the wire 12 (not contacting), the OFF signal is continued to be output.

In the "wire-contact detection sensor continuing output of OFF signal" of No. 4 in FIG. 5, the derailment judgment result indicates the OFF signal and indicates the condition where the counterweight 3 is derailed, and the operation of the car 1 is stopped.

In "pass-through detection sensor continuing output of OFF signal" of No. 5 in FIG. 5, because a signal output circuit of the upper portion pass-through detection sensor 16 is in failure even when the wire 12 passes through the upper portion pass-through detection sensor 16 (passing through), the OFF signal is continued to be output.

In the "pass-through detection sensor continuing output of OFF signal" of No. 5 in FIG. 5, the derailment judgment result indicates the OFF signal and indicates the condition where the counterweight 3 is derailed, and the operation of the car 1 is stopped.

In "wire-contact detection sensor continuing output of ON signal" of No. 6 in FIG. 5, because the signal output circuit of the upper portion wire-contact detection sensor 17 is in failure even when the upper portion wire-contact detection sensor 17 is in contact with the wire 12 (contacting), the ON signal is continued to be output.

In other words, even when the wire 12 is in contact with the upper portion wire-contact detection sensor 17, because the signal output circuit is in failure, the upper portion wire-contact detection sensor 17 continues to output the ON signal.

The upper portion pass-through detection sensor 16 outputs the ON signal when the wire 12 passes through the upper portion pass-through detection sensor 16 (passing through) and outputs the OFF signal when the wire 12 does not pass through the upper portion pass-through detection sensor 16 (not passing through).

In the "wire-contact detection sensor continuing output of ON signal" of No. 6 in FIG. 5, based on the pass-through detection signal of the upper portion pass-through detection sensor 16, the derailment judgment result indicates either one of the ON signal or the OFF signal. Based on a condition of rail installation of the counterweight 3, the operation of the car 1 is either continued or stopped.

In the "wire-contact detection sensor continuing output of ON signal" of No. 6 in FIG. 5, even when the signal output circuit of the upper portion wire-contact detection sensor 17 as one detection sensor is in failure, the CPU 22 can detect derailment of the counterweight 3 by the pass-through detection signal of the upper portion pass-through detection sensor 16 as the other detection sensor.

In "pass-through detection sensor continuing output of ON signal" of No. 7 in FIG. 5, because the signal output circuit of the upper portion pass-through detection sensor 16 is in failure even when the wire 12 does not pass through the upper portion pass-through detection sensor 16, the ON signal is continued to be output.

In other words, even when the wire 12 does not pass through the upper portion pass-through detection sensor 16, because the signal output circuit is in failure, the upper portion pass-through detection sensor 16 continues to output the ON signal.

The upper portion wire-contact detection sensor 17 outputs the ON signal when the wire 12 is not in contact with the upper portion wire-contact detection sensor 17 (not contacting) and outputs the OFF signal when the wire 12 is in contact with the upper portion wire-contact detection sensor 17 (contacting).

In the "pass-through detection sensor continuing output of ON signal" of No. 7 in FIG. 5, based on the wire-contact detection signal of the upper portion wire-contact detection sensor 17, the derailment judgment result indicates either one of the ON signal or the OFF signal. Based on the condition of rail installation of the counterweight 3, the operation of the car 1 is either continued or stopped.

In the "pass-through detection sensor continuing output of ON signal" of No. 7 in FIG. 5, even when the signal output circuit of the upper portion pass-through detection sensor 16 as one detection sensor is in failure, the CPU 22 can detect derailment of the counterweight 3 by the wire-contact detection signal of the upper portion wire-contact detection sensor 17 as the other detection sensor.

In "power shut-off conditions of wire-contact detection sensor and pass-through detection sensor" of No. 8 in FIG. 5, each of the upper portion pass-through detection sensor 16 and the upper portion wire-contact detection sensor 17 outputs the OFF signal due to power shut-off, the derailment judgment result indicates the OFF signal, and the operation of the car 1 is stopped. Note that the power shut-off includes disconnection of wiring for power supply to the upper portion pass-through detection sensor 16 and the upper portion wire-contact detection sensor 17.

As described above, the derailment detection system for an elevator according to the first embodiment provides an effect of making it possible to detect derailment of the counterweight without performing shutting off by a current shut-off circuit for a conductive wire for securing safety even when work for maintenance and check is performed in the shaft.

In addition, the derailment detection system provides an effect where plural sensors, which are the wire-contact detection sensor and the pass-through detection sensor, are used and the derailment judgment can thereby be carried out by the other detection sensor even when one detection sensor is in failure.

Second Embodiment

Apparatuses installed in a counterweight according to a second embodiment will be described by using FIG. 6A and FIG. 6B.

Figure 6A:
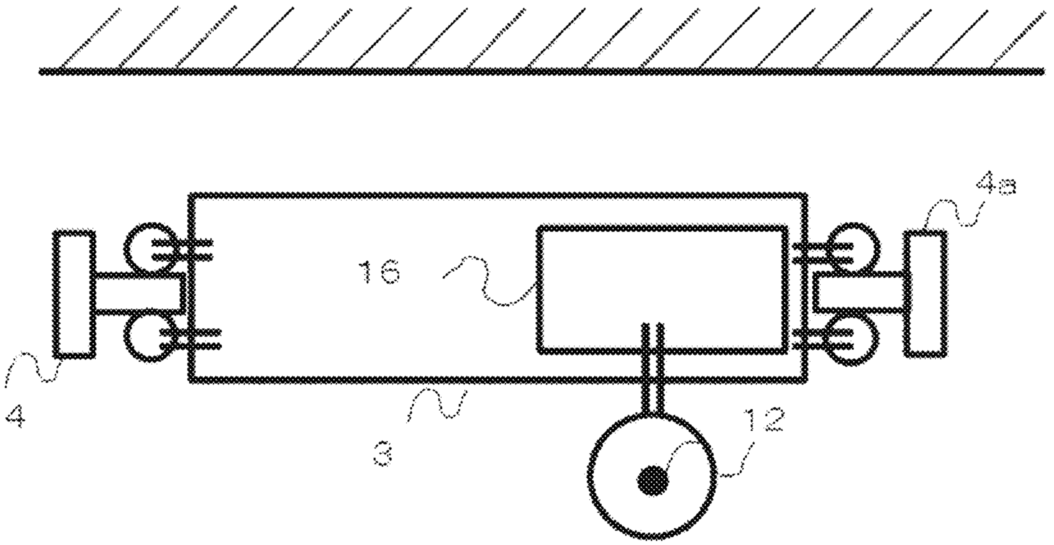
FIG. 6A is a top view of a counterweight in a shaft of an elevator according to a second embodiment.

In FIG. 6A, which is a diagram in which the counterweight 3 is seen from an upper portion of a shaft, is a diagram in which the counterweight is seen from the upper portion of the shaft of an elevator according to the second embodiment. Further, FIG. 6B, which is a diagram in which the counterweight 3 is seen from a side surface of the shaft, is a diagram in which the counterweight of the elevator according to the second embodiment is seen from the side surface of the shaft.

Figure 6B:
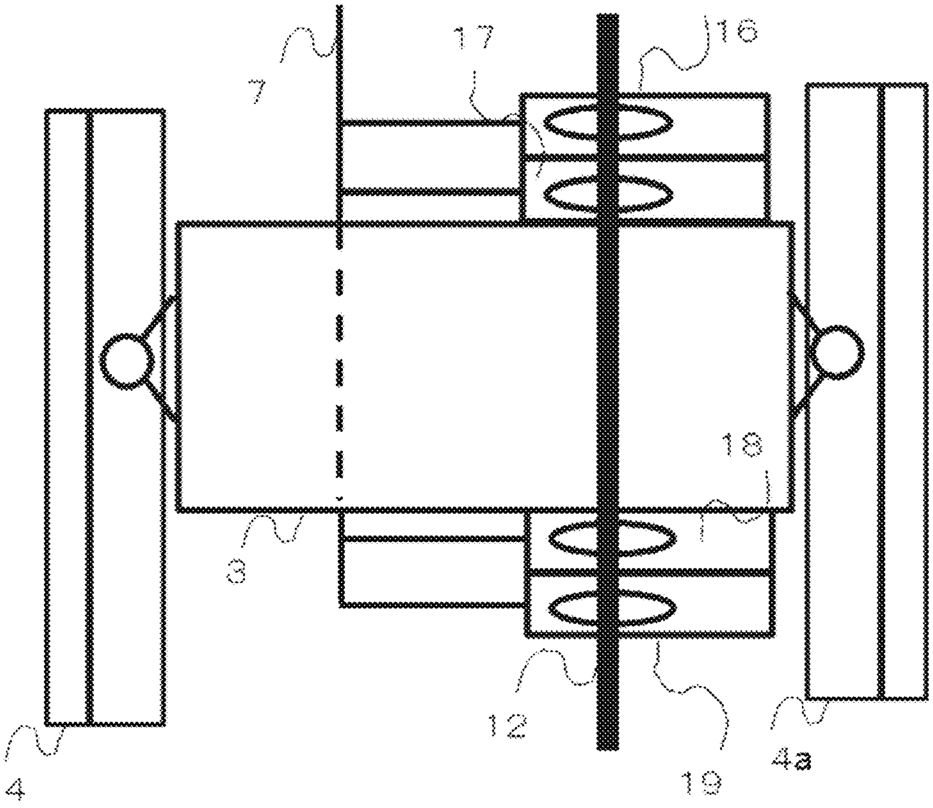
FIG. 6B is a side view of the counterweight in the shaft of the elevator according to the second embodiment.

Note that in illustration in FIG. 6A and FIG. 6B, the same reference characters as those in FIG. 2A to FIG. 2D are given to portions which correspond to apparatuses installed in the counterweight according to the first embodiment, and descriptions thereof will not be made.

In FIG. 6B, which is the diagram in which the counterweight 3 is seen from the side surface of the shaft, the counterweight 3 includes the upper portion pass-through detection sensor 16, the upper portion wire-contact detection sensor 17, a lower portion pass-through detection sensor 18, and a lower portion wire-contact detection sensor 19.

The lower portion pass-through detection sensor 18 and the lower portion wire-contact detection sensor 19 are installed in a lower portion of the counterweight 3 and are connected with the wiring cable 7.

The lower portion pass-through detection sensor 18 may be installed on a lower side of the lower portion wire-contact detection sensor 19.

The lower portion pass-through detection sensor 18 is a pass-through detection sensor which includes a tubular detection unit through whose internal portion the wire 12 passes and which detects whether or not the wire 12 passes through the internal portion of the tubular detection unit. A pass-through detection signal which is detected by each of the pass-through detection sensors is sent to the control panel 6 via the wiring cable 7.

The lower portion wire-contact detection sensor 19 is a wire-contact detection sensor which includes a tubular detection unit through whose internal portion the wire 12 passes and which detects whether or not the wire 12 is in contact with the tubular detection unit. A wire-contact detection signal which is detected by each of the wire-contact detection sensors is sent to the control panel 6 via the wiring cable 7.

The tubular detection units of the lower portion pass-through detection sensor 18 and the lower portion wire-contact detection sensor 19 may be integrally formed.

Shapes of the detection units of the lower portion pass-through detection sensor 18 and the lower portion wire-contact detection sensor 19 may be polygonal shapes other than tubular shapes.

In FIG. 6A and FIG. 6B, a description is made while the upper portion pass-through detection sensor 16 and the upper portion wire-contact detection sensor 17 are installed in the upper portion of the counterweight 3 and the lower portion pass-through detection sensor 18 and the lower portion wire-contact detection sensor 19 are installed in the lower portion of the counterweight 3. However, the pass-through detection sensors and the wire-contact detection sensors may be installed in any positions of the counterweight 3 as long as the positions are positions in which passing through and contact with the wire 12 can be detected.

Figure 7:
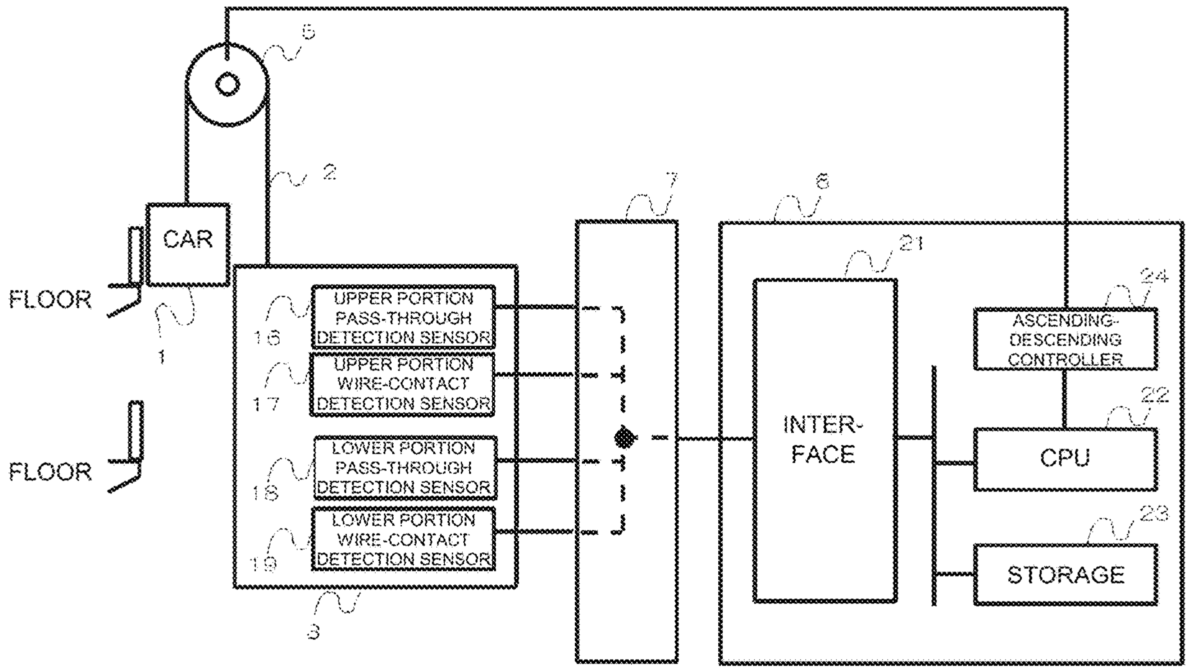
FIG. 7 is a block diagram of a derailment detection system for the elevator according to the second embodiment.

A block diagram of a derailment detection system for an elevator according to the second embodiment will be described by using FIG. 7. FIG. 7 is a block diagram of the derailment detection system for an elevator according to the second embodiment.

Note that in illustration in FIG. 7, the same reference characters as those in FIG. 3 are given to portions which correspond to those in the block diagram of the derailment detection system for an elevator according to the first embodiment, and descriptions thereof will not be made.

The interface 21 of the control panel 6 respectively receives the upper portion pass-through detection signal, the upper portion wire-contact detection signal, a lower portion pass-through detection signal, and a lower portion wire-contact detection signal that are transmitted from the upper portion pass-through detection sensor 16, the upper portion wire-contact detection sensor 17, the lower portion pass-through detection sensor 18, and the lower portion wire-contact detection sensor 19, which are installed in the counterweight 3, and transmits the respective received detection signals to the CPU 22.

Based on the upper portion pass-through detection signal, the upper portion wire-contact detection signal, the lower portion pass-through detection signal, and the lower portion wire-contact detection signal which are obtained via the interface 21, the CPU 22 outputs the derailment judgment result.

Figure 8:
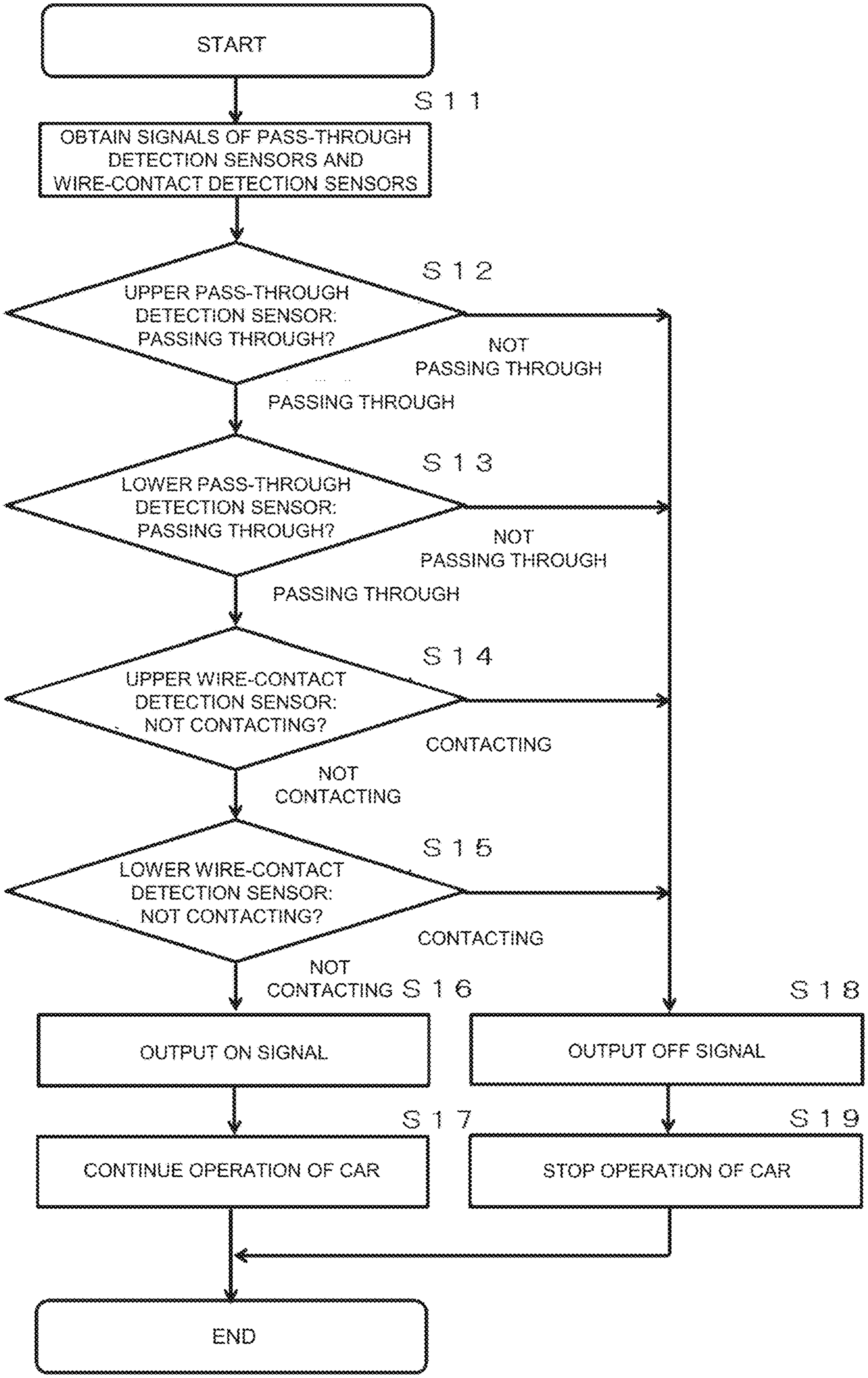
FIG. 8 is a flowchart of the derailment detection system for the elevator according to the second embodiment.

By using FIG. 8, a description will be made about combinations of a flowchart and judgment results of the derailment detection system for an elevator according to the second embodiment. FIG. 8 is a flowchart of the derailment detection system for an elevator according to the second embodiment.

In step S11, the CPU 22 of the control panel 6 of the derailment detection system for an elevator respectively obtains the upper portion pass-through detection signal, the upper portion wire-contact detection signal, the lower portion pass-through detection signal, and the lower portion wire-contact detection signal from the upper portion pass-through detection sensor 16, the upper portion wire-contact detection sensor 17, the lower portion pass-through detection sensor 18, and the lower portion wire-contact detection sensor 19.

Here, the following signals are output from the lower portion pass-through detection sensor 18 and the lower portion wire-contact detection sensor 19 in accordance with the detection result about the wire 12.

The lower portion pass-through detection sensor 18 outputs an ON signal as the pass-through detection signal when the wire 12 passes through the detection unit and outputs an OFF signal as a non-pass-through signal when the wire 12 does not pass through the detection unit. Further, when no power is supplied to the lower portion pass-through detection sensor 18, the OFF signal is output.

The lower portion wire-contact detection sensor 19 outputs an OFF signal as a contact signal when the wire 12 is in contact with a contact detection unit and outputs an ON signal as a non-contact signal when the wire 12 is not in contact with the contact detection unit. Further, when no power is supplied to the lower portion wire-contact detection sensor 19, the OFF signal is output.

In step S12, the CPU 22 judges whether or not the upper portion pass-through detection sensor 16 outputs the ON signal.

In a case where the ON signal is obtained from the upper portion pass-through detection sensor 16, the CPU 22 proceeds to step S13 (PASSING THROUGH in step S12).

On the other hand, in a case where the ON signal cannot be obtained from the upper portion pass-through detection sensor 16, the CPU 22 proceeds to step S18.

In step S13, the CPU 22 judges whether or not the lower portion pass-through detection sensor 18 outputs the ON signal.

In a case where the ON signal is obtained from the lower portion pass-through detection sensor 18, the CPU 22 proceeds to step S14 (PASSING THROUGH in step S13).

On the other hand, in a case where the ON signal cannot be obtained from the lower portion pass-through detection sensor 18, the CPU 22 proceeds to step S18.

In step S14, the CPU 22 judges whether or not the upper portion wire-contact detection sensor 17 outputs the ON signal.

In a case where the ON signal is obtained from the upper portion wire-contact detection sensor 17, the CPU 22 proceeds to step S15 (NOT CONTACTING in step S14).

On the other hand, in a case where the ON signal cannot be obtained from the upper portion wire-contact detection sensor 17, the CPU 22 proceeds to step S18.

In step S15, the CPU 22 judges whether or not the lower portion wire-contact detection sensor 19 outputs the ON signal.

In a case where the ON signal is obtained from the lower portion wire-contact detection sensor 19, the CPU 22 proceeds to step S16 (NOT CONTACTING in step S15).

On the other hand, in a case where the ON signal cannot be obtained from the lower portion wire-contact detection sensor 19, the CPU 22 proceeds to step S18.

In step S16, based on the upper portion pass-through detection signal, the upper portion wire-contact detection signal, the lower portion pass-through detection signal, and the lower portion wire-contact detection signal, the CPU 22 outputs the ON signal to the ascending-descending controller 24 and proceeds to step S17.

In step S17, the ascending-descending controller 24 continues operations of ascent and descent of the car 1 based on the ON signal obtained from the CPU 22.

In step S18, based on the upper portion pass-through detection signal, the upper portion wire-contact detection signal, the lower portion pass-through detection signal, and the lower portion wire-contact detection signal, the CPU 22 outputs the OFF signal to the ascending-descending controller 24 and proceeds to step S19.

In step S19, the ascending-descending controller 24 stops operations of ascent and descent of the car 1 based on the OFF signal obtained from the CPU 22.

As described above, the derailment detection system for an elevator according to the second embodiment provides an effect where the wire-contact detection sensors and the pass-through detection sensors are installed in plural places of the counterweight and a judgment about derailment can thereby certainly be carried out.

The derailment detection system for an elevator of the present disclosure, the derailment detection system being configured as described above, is characterized to include the wire 12 which is installed in a space not interfering with a movement space of the ascending-descending bodies ascending and descending in the shaft and is stretched in parallel with the guide rails 4 and 4*a* guiding ascent and descent of the counterweight 3, the pass-through detection sensor which is installed in the counterweight 3 and detects whether or not the wire 12 passes through the internal portion, the wire-contact detection sensor which is installed in the counterweight 3 and detects whether or not it is in contact with the wire 12, and the derailment judgment processor which performs a derailment judgment process based on signals output from the pass-through detection sensor and the wire-contact detection sensor.

Accordingly, an effect is provided where it becomes possible to detect derailment without performing shutting off by the current shut-off circuit for the conductive wire for securing safety when work for maintenance and check is performed in the shaft.

In addition, the derailment detection system for an elevator provides an effect where plural sensors, which are the wire-contact detection sensor and the pass-through detection sensor, are used and the judgment about derailment can thereby be carried out by the other detection sensor even when one detection sensor is in failure.

Further, the derailment detection system for an elevator is characterized in that the pass-through detection sensor turns ON an output of the pass-through detection signal when passing through of the wire 12 is detected and turns OFF the output of the pass-through detection signal when passing through of the wire 12 is not detected, the wire-contact detection sensor turns OFF an output of the contact detection signal when contact with the wire 12 is detected and turns ON the output of the contact detection signal when contact with the wire 12 is not detected, and the derailment judgment processor judges that derailment is occurring in at least one of cases where the output of the pass-through detection signal is turned OFF and where the output of the contact detection signal is turned OFF.

Accordingly, the derailment detection system for an elevator provides an effect where the wire-contact detection sensors and the pass-through detection sensors are installed in plural places of the counterweight and the judgment about derailment can thereby certainly be carried out. Further, the derailment detection system for an elevator is characterized in that the pass-through detection sensors and the wire-contact detection sensors are installed in the upper portion and the lower portion of the counterweight 3.

Accordingly, the derailment detection system for an elevator provides an effect where the wire-contact detection sensors and the pass-through detection sensors are installed in plural places of the counterweight 3 and the judgment about derailment can thereby more certainly be carried out.

Further, the derailment detection system for an elevator is characterized in that the derailment judgment processor stops ascent and descent of the ascending-descending bodies when a judgment is made that derailment is occurring.

Accordingly, the derailment detection system for an elevator provides an effect where ascent and descent of the ascending-descending bodies are stopped when the counterweight 3 is derailed and damage to apparatuses of the shaft is thereby avoided.

SUPPLEMENTARY NOTES

In the following, aspects of the present disclosure will collectively be described as supplementary notes.

(Supplementary Note 1)

A derailment detection system for an elevator, the derailment detection system including:

- a wire that is installed in a space which does not interfere with a movement space of ascending-descending bodies ascending and descending in a shaft and that is stretched in parallel with a guide rail guiding ascent and descent of a counterweight;
- a pass-through detection sensor that is installed in the counterweight and detects whether or not the wire passes through an internal space;
- a wire-contact detection sensor that is installed in the counterweight and detects whether or not the wire-contact detection sensor is in contact with the wire; and
- derailment judgment processor that performs a derailment judgment process based on signals output from the pass-through detection sensor and the wire-contact detection sensor.

(Supplementary Note 2)

The derailment detection system described in the supplementary note 1, in which the pass-through detection sensor turns ON an output of a pass-through detection signal when passing through of the wire is detected and turns OFF the output of the pass-through detection signal when passing through of the wire is not detected, the wire-contact detection sensor turns OFF an output of a wire-contact detection signal when contact with the wire is detected and turns ON the output of the wire-contact detection signal when contact with the wire is not detected, and the derailment judgment processor judges that derailment is occurring when at least one of the output of the pass-through detection signal and the output of the wire-contact detection signal is turned OFF.

(Supplementary Note 3)

The derailment detection system described in the supplementary note 1 or the supplementary note 2, in which the pass-through detection sensor and the wire-contact detection sensor are installed in an upper portion and a lower portion of the counterweight.

(Supplementary Note 4)

The derailment detection system described in any supplementary note of the supplementary notes 1 to 3, in which when a judgment is made that derailment is occurring.

the derailment judgment processor stops ascent and descent of the ascending-descending bodies.

The invention claimed is:

1. A derailment detection system for an elevator, the derailment detection system comprising:

- a wire that is installed in a space which does not interfere with a movement space of ascending-descending bodies ascending and descending in a shaft and that is stretched in parallel with a guide rail guiding ascent and descent of a counterweight;
- a pass-through detection sensor that is installed in the counterweight and includes a tubular detection unit through an internal portion of which the wire passes, wherein the pass-through detection sensor detects whether or not the wire passes through the internal portion of the tubular detection unit of the pass-through detection sensor;
- a wire-contact detection sensor that is installed in the counterweight and includes a tubular detection unit through an internal portion of which the wire passes, wherein the wire-contact detection sensor detects whether or not the wire is in contact with the tubular detection unit of the wire-contact detection sensor; and
- a derailment judgment processor that performs a derailment judgment process based on signals output from the pass-through detection sensor and the wire-contact detection sensor.

2. The derailment detection system according to claim 1, wherein the pass-through detection sensor:

turns ON an output of a pass-through detection signal when passing through of the wire is detected, and turns OFF the output of the pass-through detection signal when passing through of the wire is not detected, the wire-contact detection sensor:

turns OFF an output of a wire-contact detection signal when contact with the wire is detected, and turns ON the output of the wire-contact detection signal when contact with the wire is not detected, and the derailment judgment processor:

judges that derailment is occurring when at least one of the output of the pass-through detection signal and the output of the wire-contact detection signal is turned OFF.

3. The derailment detection system according to claim 1, wherein the pass-through detection sensor and the wire-contact detection sensor are installed in an upper portion and a lower portion of the counterweight.

4. The derailment detection system according to claim 2, wherein the pass-through detection sensor and the wire-contact detection sensor are installed in an upper portion and a lower portion of the counterweight.

5. The derailment detection system according to claim 1, wherein when a judgment is made that derailment is occurring, the derailment judgment processor stops ascent and descent of the ascending-descending bodies.

6. The derailment detection system according to claim 2, wherein when a judgment is made that derailment is occurring, the derailment judgment processor stops ascent and descent of the ascending-descending bodies.

7. The derailment detection system according to claim 3, wherein when a judgment is made that derailment is occurring, the derailment judgment processor stops ascent and descent of the ascending-descending bodies.

8. The derailment detection system according to claim 4, wherein when a judgment is made that derailment is occurring, the derailment judgment processor stops ascent and descent of the ascending-descending bodies.

9. The derailment detection system according to claim 2, wherein the derailment judgment processor judges that derailment is occurring when the output of the wire-contact detection signal is turned OFF as a result of the wire coming into contact with the tubular detection unit of the wire-contact detection sensor.

10. The derailment detection system according to claim 2, wherein the derailment judgment processor judges that derailment is occurring when the output of the pass-through detection signal is turned OFF as a result of the wire being disconnected and no longer passing through the internal portion of the tubular detection unit of the pass-through detection sensor.

11. The derailment detection system according to claim 2, wherein, when a signal output circuit of one of the pass-through detection sensor and the wire-contact detection sensor is in a failure state in which the output of a corresponding one of the pass-through detection signal and the wire-contact detection signal continues to be turned OFF, the derailment judgment processor judges that derailment is occurring.

12. The derailment detection system according to claim 2, wherein, when a signal output circuit of one of the pass-through detection sensor and the wire-contact detection sensor is in a failure state in which the output of a corresponding one of the pass-through detection signal and the wire-contact detection signal continues to be turned ON, the derailment judgment processor detects derailment of the counterweight based on the output of the detection signal of the other of the pass-through detection sensor and the wire-contact detection sensor.

13. The derailment detection system according to claim 2, wherein, under a power shut-off condition where no power is supplied to the pass-through detection sensor and the wire-contact detection sensor, the output of the pass-through detection signal and the output of the wire-contact detection signal are each turned OFF, and the derailment judgment processor judges that derailment is occurring.

14. The derailment detection system according to claim 2, wherein the derailment judgment processor judges that derailment is not occurring and continues ascent and descent of the ascending-descending bodies only when the output of the pass-through detection signal is turned ON and the output of the wire-contact detection signal is turned ON.

15. The derailment detection system according to claim 2, wherein the pass-through detection sensor comprises an upper portion pass-through detection sensor and a lower portion pass-through detection sensor that are installed in the counterweight, the wire-contact detection sensor comprises an upper portion wire-contact detection sensor and a lower portion wire-contact detection sensor that are installed in the counterweight, each of the upper portion and lower portion pass-through detection sensors outputs a pass-through detection signal and each of the upper portion and lower portion wire-contact detection sensors outputs a wire-contact detection signal, and the derailment judgment processor judges that derailment is occurring when the output of at least one of the pass-through detection signals and the wire-contact detection signals is turned OFF.

16. The derailment detection system according to claim 15, wherein the derailment judgment processor judges that derailment is not occurring and continues ascent and descent of the ascending-descending bodies only when the outputs of the pass-through detection signals of the upper portion pass-through detection sensor and the lower portion pass-through detection sensor and the outputs of the wire-contact detection signals of the upper portion wire-contact detection sensor and the lower portion wire-contact detection sensor are all turned ON.

17. The derailment detection system according to claim 2, wherein the derailment judgment processor is included in a control panel, the control panel comprising an interface that receives the pass-through detection signal and the wire-contact detection signal and transmits the received signals to the derailment judgment processor, and an ascending-descending controller that continues or stops ascent and descent of the ascending-descending bodies based on a derailment judgment result output from the derailment judgment processor.

18. The derailment detection system according to claim 1, wherein the tubular detection unit of the pass-through detection sensor and the tubular detection unit of the wire-contact detection sensor are integrally formed.

19. The derailment detection system according to claim 3, wherein the pass-through detection sensor comprises a lower portion pass-through detection sensor and the wire-contact detection sensor comprises a lower portion wire-contact detection sensor, and the lower portion pass-through detection sensor is installed on a lower side of the lower portion wire-contact detection sensor.

20. The derailment detection system according to claim 1, wherein the wire is mounted on a portion extending from a lower side of a floor surface of a machine room floor to a pit in a lowermost portion of the shaft.

* * * * *